United States Patent [19]

Bush et al.

[11] Patent Number: 5,020,648
[45] Date of Patent: Jun. 4, 1991

[54] RATCHET ASSEMBLY

[75] Inventors: Mike Bush, Nottingham, England; Norman Hatton, Marietta, Ga.; Keith Mellor, deceased, late of Nottingham, England, by Bernadette L. Mellor, administratrix

[73] Assignee: Reliable Plastics Engineering Company, Marietta, Ga.

[21] Appl. No.: 270,148

[22] Filed: Nov. 14, 1988

[51] Int. Cl.[5] .................... F16D 11/00; F16D 13/00
[52] U.S. Cl. .................... 192/46; 188/82.6; 192/64; 192/108
[58] Field of Search .............. 192/46, 64, 108, 77, 192/76; 188/82.6

[56] References Cited

U.S. PATENT DOCUMENTS

| 3,196,999 | 7/1965 | Bradbury | 192/27 |
| 3,300,003 | 1/1967 | Peterson et al. | 192/46 |
| 3,466,947 | 9/1969 | Smith | 188/82.6 |
| 3,667,307 | 6/1972 | Kelch | 192/46 |
| 4,363,390 | 12/1982 | Eisend et al. | 192/46 |
| 4,453,729 | 6/1984 | Lucken | 192/46 |
| 4,711,331 | 12/1987 | Hoffmann | 192/46 |
| 4,715,246 | 12/1987 | Hartmann | 74/594.2 |

FOREIGN PATENT DOCUMENTS

| 22523 | of 1899 | United Kingdom | 192/46 |
| 4842 | of 1909 | United Kingdom | 192/46 |
| 2174464 | of 1986 | United Kingdom | 192/64 |

Primary Examiner—Randolph A. Reese
Assistant Examiner—Carol I. Bordas
Attorney, Agent, or Firm—Jones, Askew & Lunsford

[57] ABSTRACT

A light-weight, corrosion-resistant, multiple engaging ratchet assembly comprising few, easily manufactured parts for simplified operation of pawls and ratchet teeth in a free-wheel drive gear ratchet assembly. An outer wheel includes a cavity to receive an inner wheel with a pawl ring or integral pawls. The pawls ride over ratchet teeth protruding from a circumferential surface on the outer wheel when the inner wheel and the outer wheel rotate in opposite directions. Turning the inner wheel in a second direction the same as the outer wheel direction of rotation brings the pawls into engagement with the ratchet teeth causing the inner wheel to drive the outer wheel.

6 Claims, 6 Drawing Sheets

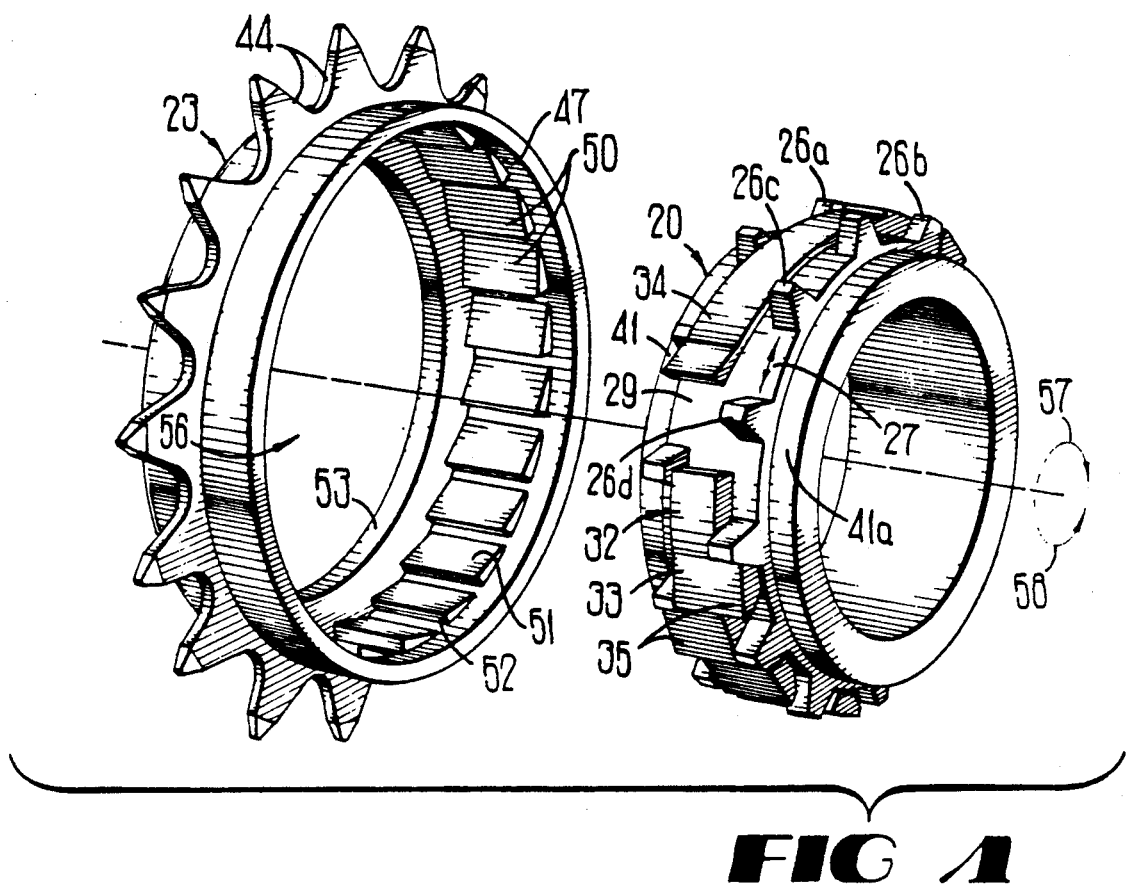
FIG A
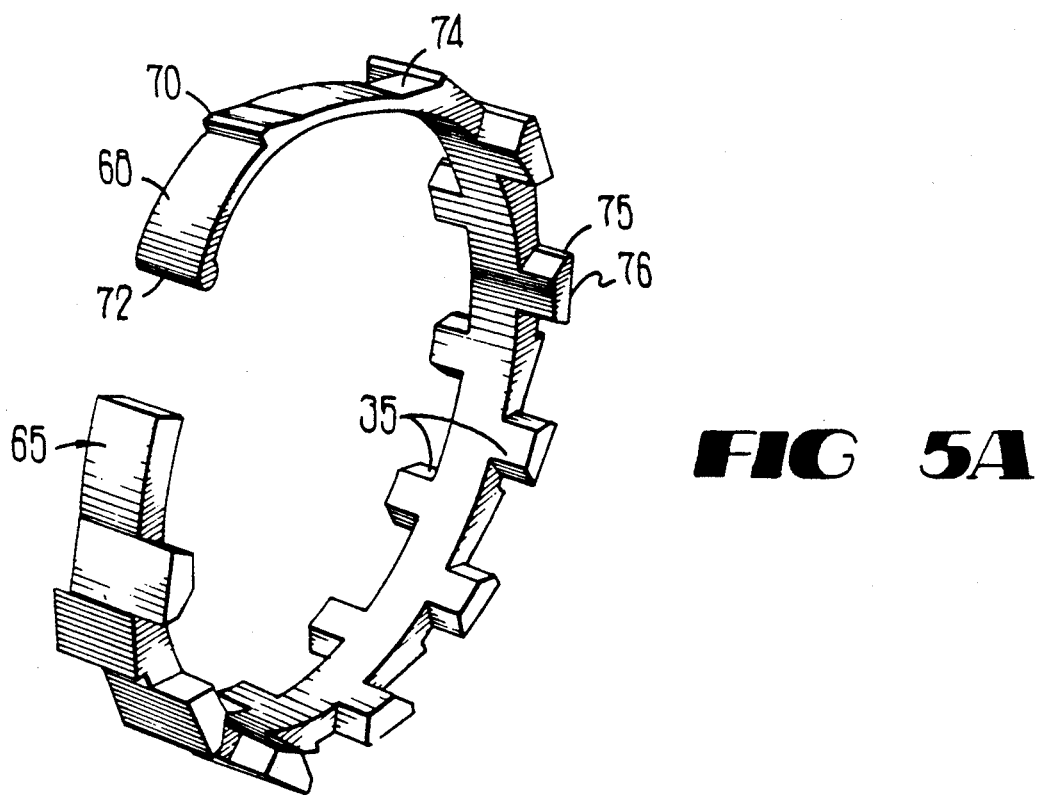
FIG 5A

RATCHET ASSEMBLY

TECHNICAL FIELD

The present invention relates to an improved assembly. In particular, the invention relates to an improved free-wheel drive gear ratchet assembly that provides simple, direct engagement of drive pawls with ratchet teeth to communicate the drive force. The assembly includes a reduced number of easily manufactured and assembled parts.

DESCRIPTION OF THE PRIOR ART

Known ratchet assemblies, such as the drive hubs used for bicycles, generally have a drive wheel and a second driven gear or wheel. The wheels rotate in opposite direction to "free-wheel" with respect to each other. The drive wheel however, when rotated in a second direction, communicates the drive force to the second wheel, and both wheels turn in the same direction. The drive force communicates when a pawl and a ratchet tooth engage to connect together the drive wheel and the driven wheel. Reversing the rotation of the drive wheel disengages the pawl and the ratchet tooth, and the driven wheel again free-wheels.

Known ratchet assemblies have many operating parts. Some include springs, rollers, and pivotable arms. As a result, these assemblies are complex in operation. Further, manufacture and assembly of such ratchet assemblies is difficult. These previously known ratchet assemblies were manufactured primarily of metal, which contributed to the ratchet assembly being relatively heavy and susceptible to corrosion. Component wear and fatigue lead to ratchet assembly failure.

Some ratchet assemblies use mechanical means to engage the pawl (or pawls) with the ratchet teeth. One known mechanical connection is the use of a spring mechanism to engage these pawls with the ratchet teeth. U.S. Pat. No. 3,196,999 describes a ratchet assembly or an intermittent clutch with a C-shaped friction band operated by spring-biased rollers and a stop lever. The C-shaped band includes two lugs and has frictional contact with the interior surface of a driving drum. The clutch is engaged by moving the stop lever away from the axial lugs. The rotation of the friction band moves the rollers into a tight wedging relationship between the driving drum and a clutch band. The clutch will continue to rotate until the stop lever is again placed in the path of the lugs, causing the rollers to roll back and disengage from the wedging relationship.

U.S. Pat. No. 4,363,390 describes a ratchet gear for the driving hub of a bicycle. The ratchet assembly comprises a pawl carrier surrounded by a gear carrier. A pawl is located in a compartment on the peripheral surface of the pawl carrier. The pawl is pivotally mounted in a bearing bushing and biased outwardly against the gear carrier by an open spring ring. Counterclockwise movement of the pawl carrier allows the pawl to pivot radially inward and pass the entrainer tooth. Clockwise movement engages the head of the pawl against the entrainer tooth to communicate the drive force between the pawl carrier and the gear carrier.

U.S. Pat. No. 4,711,331 describes a freewheel overrunning clutch particularly applicable for two-wheel vehicles. The clutch comprises an inner wheel and an outer wheel with three rectangular clutch pawls positioned within a plastic ring. Rotation of the outer wheel brings the ends of the pawls into contact with the outer teeth of the inner wheel and the outer wheel.

U.S. Pat. No. 4,715,246 describes a three-speed planetary transmission for pedal-powered vehicles. The transmission comprises a pair of spring-loaded dogs which engage in the inner cogs of the drive fittings.

Another known pawl engagement method includes a rotational key which transfers a rotational force and causes the pawl to engage the ratchet teeth. U.S. Pat. No. 3,300,003 describes a unidirectional clutch mechanism having an off-center, single-tooth pawl drive. The pawl drive is engaged by rotating a drive shaft and a key to catch a time of a split washer pawl. This drives the pawl into the engagement with the ratchet teeth on the ratchet gear.

Several problems exist with such ratchet drive gear assemblies. The opportunities for ratchet assembly failure increases with the additional parts. The manufacture and assembly of a multi-part ratchet assembly is more costly in both manpower and materials than more simple structures.

Another problem associated with prior ratchet assemblies is the inability to resist corrosion. Ratchet assemblies are often exposed to corrosive environments such as water, saltwater, and mud. When corrosion occurs, friction between the moving parts of the assembly increases and the structural integrity of each part declines.

Free-wheel ratchet assemblies are typically used on bicycles. Today it is desirable to produce lightweight bikes, particularly for racing, but for recreational use as well. The present clutch assemblies made of metallic materials add weight to the bicycle.

Therefore, there exists a need in the prior art for a lightweight, corrosion-resistant ratchet assembly that is inexpensive to manufacture and assemble, and operates simply, reliably and maintenance free.

BRIEF DESCRIPTION OF THE PRESENT INVENTION

The present invention solves the above described problems by providing a lightweight, corrosion resistant ratchet assembly. The preferred embodiment of the present invention provides one-way rotational movement between a drive wheel and a driven wheel in a free-wheel drive gear ratchet assembly. The disclosed ratchet assembly reduces the number of component parts, uses flexible pawls, and provides simplified operation of the pawl and ratchet teeth engagement.

The present invention comprises an inner drive wheel with a circumferential pawl ring. The pawl ring in one embodiment is a C-shaped ring which is carried on the outer surface of the drive wheel. In an alternate embodiment, the pawl ring is integral with the drive wheel. The drive wheel is co-axial with and housed in a cavity defined by an outer wheel to be driven. A plurality of pawls extend from the pawl ring. The outer wheel contains ratchet teeth on an inner circumference within the cavity of the outer wheel. The outer wheel is driven by the inner wheel when the pawls engage in the ratchet teeth.

The pawls in one embodiment of the invention are integral with the inner drive wheel and are flexible radially to ride freely over the ratchet teeth when the inner drive wheel is rotated in one direction. The pawl ring is preferably manufactured from materials providing high compressive strength permitting the pawls to engage the ratchet teeth to drive the outer wheel without shattering or destruction of the pawls or the pawl ring. In yet another embodiment of the invention, a separate pawl ring moves radially to wedge between the inner drive wheel and the outer wheel upon engagement of a drive pawl with a ratchet tooth.

Embodiments of the present invention can be mass produced with injection molded plastics. Components of the present invention may also be made of other light-weight materials such as aluminum but would not be mass produced as easily and as inexpensively.

Many ratchet assembly applications require exposure to harsh environments. The present invention is corrosion resistant and able to operate in harsh environments without additional lubricants or coatings.

It is an object of the present invention to provide an improved ratchet assembly.

It is an object of the present invention to provide a ratchet assembly having a minimum of parts.

It is an object of the present invention to provide a free-wheel ratchet assembly which communicates a uni-directional rotational force between a drive wheel and a driven wheel.

It is an object of the present invention to provide a ratchet assembly drive having integral pawls.

It is an object of the present invention to provide a ratchet assembly having a pawl ring which, upon engagement of a drive pawl with a ratchet tooth, moves other pawls into contact with other ratchet teeth.

It is an object of the present invention to provide a ratchet assembly having simplified operation to engage the pawls and ratchet teeth.

It is another object of the present invention to provide a ratchet assembly that is light-weight.

It is another object of the present invention to provide a ratchet assembly that is maintenance free.

It is a further object of the present invention to provide a ratchet assembly which minimizes manufacturing time and cost.

Further, it is an object of the present invention to provide a ratchet assembly that is corrosion resistant.

Still other objects, features and advantages of the present invention will become apparent upon a reading of the following detailed description in conjunction with the drawings and appended claims.

BRIEF DESCRIPTION OF THE DRAWINGS

The invention will now be described with reference to the accompanying drawings which illustrate disclosed embodiments of the ratchet assembly of the present invention falling within the scope of the appended claims.

FIG. 1 is a perspective view of a disclosed embodiment of an inner drive wheel coaxial with an outer wheel and a pawl ring according to the present invention.

FIG. 5A is a perspective view of the pawl ring illustrated in FIG. 5.

DETAILED DESCRIPTION OF THE PREFERRED EMBODIMENT

Figure 2:
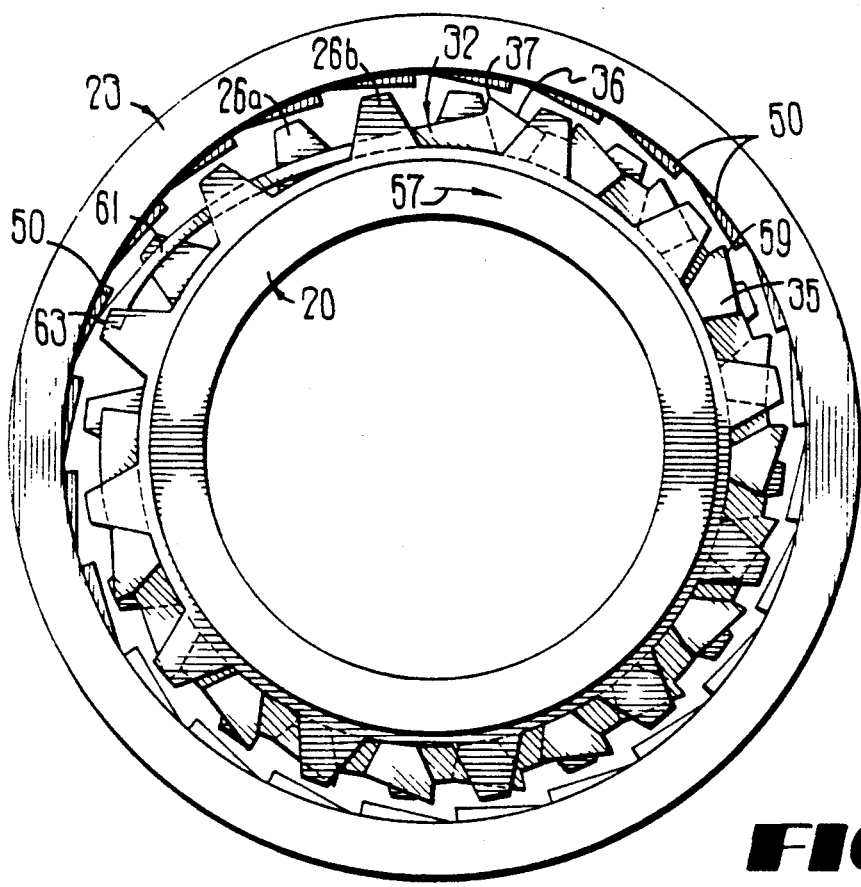
FIG. 2 is an axial view of the assembled inner drive wheel, the pawl ring, and the outer wheel, illustrated in FIG. 1.

Referring now in more detail to the drawings, in which like numerals indicate like parts throughout the several views, FIG. 1 is a perspective view of a disclosed embodiment of the present invention having an inner drive wheel 20 and an outer gear wheel 23. The inner drive wheel 20 has a cylindrical shape. Two sets of circumferential teeth 26a and 26b extend radially from the outer surface 29 of the inner wheel 20. In the illustrated embodiment, the teeth 26a of one series are off-set with respect to the teeth 26b of the second series. Adjacent teeth (26c and 26d for example) define a gap 27.

A removable pawl ring 32 wraps around the outer surface 29 and lodges between the two series of teeth 26a and 26b. (FIG. 5A illustrates in perspective view an embodiment of a pawl ring similar to the pawl ring 32. The embodiment shown in FIGS. 5A is discussed below.) The pawl ring 32 has an open C-shape and includes a first main arcuate section 33 and a smaller arcuate section 34. A plurality of pawls 35 extend axially from the ring 32 into the gaps 27 between adjacent teeth 26. As best illustrated in FIG. 2, the pawls in cross-section are wedge-shaped to define a sliding edge 36 and an engagement surface 37.

Returning to FIG. 1, recessed circumferential surfaces 41 and 41a at the lateral ends of the wheel 20 provide bearing surfaces. The bearing surface 41 engages a corresponding surface on the outer wheel 23.

The outer wheel 23 illustrated in FIG. 1 includes gear teeth 44 extending radially from the exterior surface of the wheel 23. A circumferential inner surface 47 of the outer wheel 23 includes a plurality of ratchet teeth 50. The ratchet teeth 50 in axial cross-section are wedge-shaped to define a sliding surface 51 and an engagement surface 52. One end of the outer wheel 23 includes a circumferential surface 53 which receives the surface 41 from the inner wheel 20. A plate (not illustrated) closes an inner cavity 56 in which the outer wheel 23 which receives the inner wheel 20. The plate includes a circumferential bearing surface to receive the bearing surface 41a of the inner surface wheel 20.

As may be appreciated by one of ordinary skill in the art, the wheel 20 may be connected to a drive means to rotate the wheel 20 in a first direction 57 and in a second direction 58. Such drive means includes a bicycle pedal assembly.

FIG. 2 illustrates an axial view of the assembled inner drive wheel 20 and the outer wheel 23 illustrated in FIG. 1. The gear teeth 44 however are not illustrated here or in subsequent axial view figures. The C-shaped pawl ring 32 is disposed between the radially extending series of teeth 26a and 26b. The wedge-shaped pawls 35 extend axially between the gaps 27. The pawls 35 extend outwardly to the edge 36.

The smaller arcuate section 34 of the pawl ring 32 illustrated in FIG. 2 extends curvedly from the outer surface 29 towards the inner surface 47. The C-shaped ring 32 terminates in a drive pawl 63 which reaches towards and contacts the ratchet teeth 50. The section 34 in the illustrated embodiment has a radius greater than the radius of the main section 33.

Figure 3:
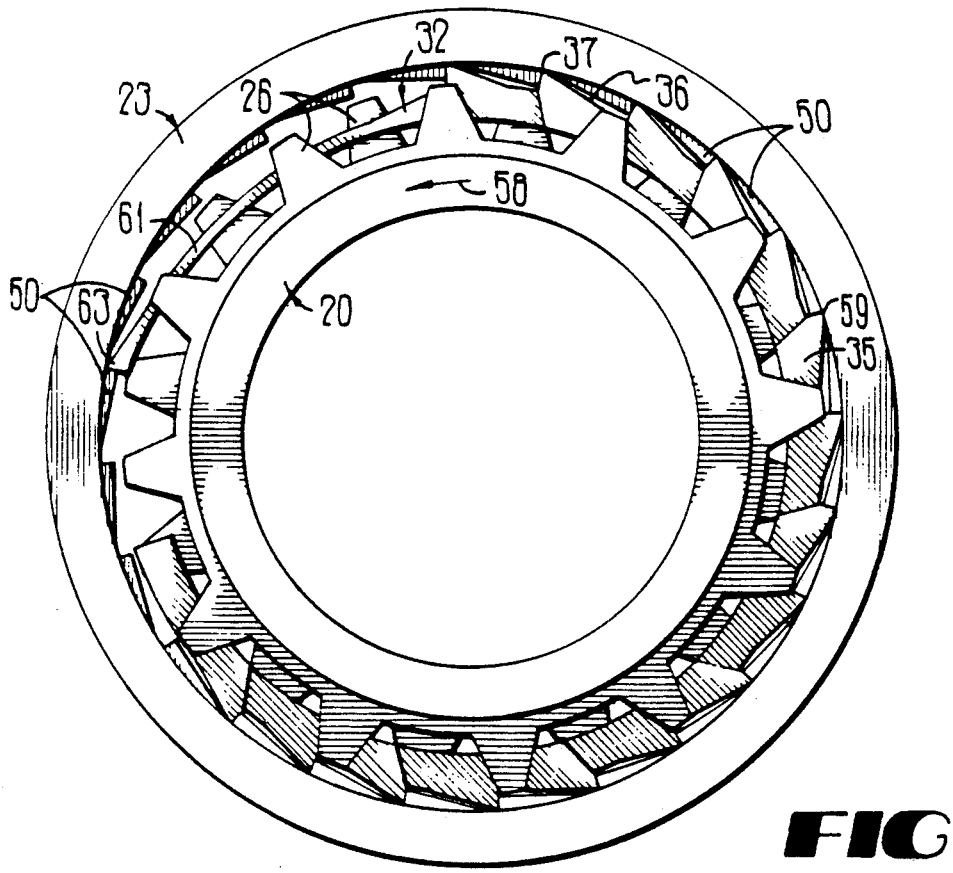
FIG. 3 is an axial view of the inner drive wheel and outer wheel illustrated in FIG. 1, with a disclosed embodiment of the pawl ring engaged on the ratchets of the outer wheel.

FIG. 3 is an axial view of the inner drive wheel 20 and the outer wheel 23 illustrated in FIGS. 1 and 2. The disclosed embodiment of the pawl ring 32 is shown with the pawls 35 contacting the engagement surfaces 52 of the ratchets 50. The pawl ring 32 is radially displaced from the surface 29.

Figure 4:
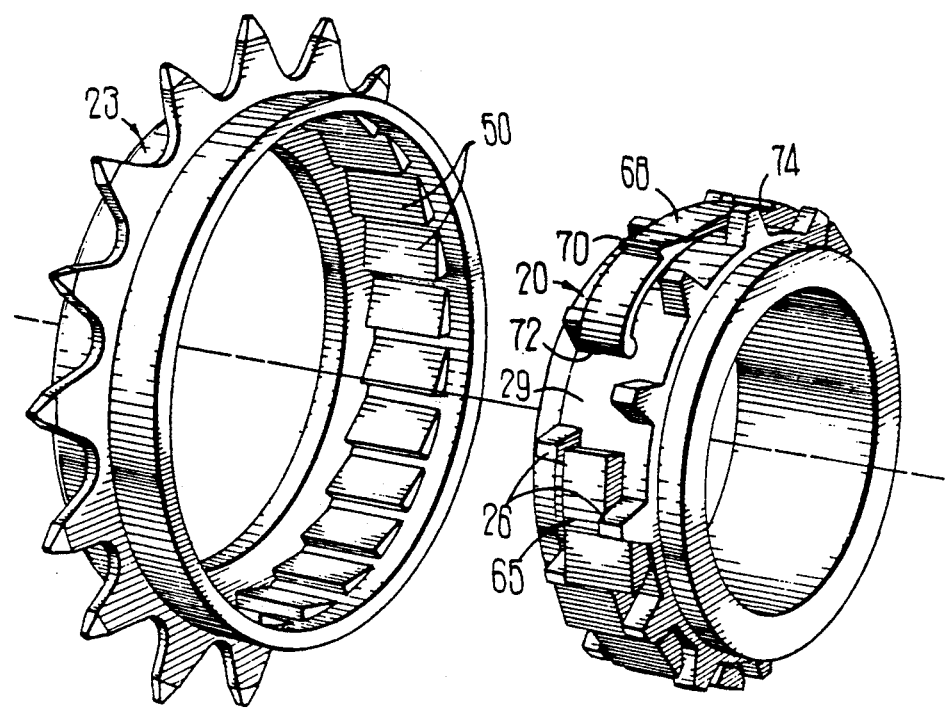
FIG. 4 is a perspective view of an alternate disclosed embodiment of an inner drive wheel, pawl ring, and the outer wheel, according to the present invention.

FIG. 4 is a perspective view of an alternate disclosed embodiment of the inner wheel drive 20 and the outer wheel 23 of the present invention. In this embodiment, a removable C-shaped pawl ring 65 includes a curved extension 68. As better illustrated in FIGS. 5 and 5A, the smaller arcuate extension 68 has a smaller radius than the main portion of the arcuate ring 65. A drive pawl 70 extends away from the outer surface of the extension 68 intermediate the end 72 and the point 74 where the small arcuate extension 68 initially curves away from the ring 65 and the inner surface 29. The end 72 in the illustrated embodiment touches the outer surface 29. The drive pawl 70 in axial view has a wedge-shape. The edge 75 at the high end of the wedge contacts the sliding surfaces 51 of the ratchet teeth 50. The high end of the wedge defines a radial engagement surface 76.

Figure 6:
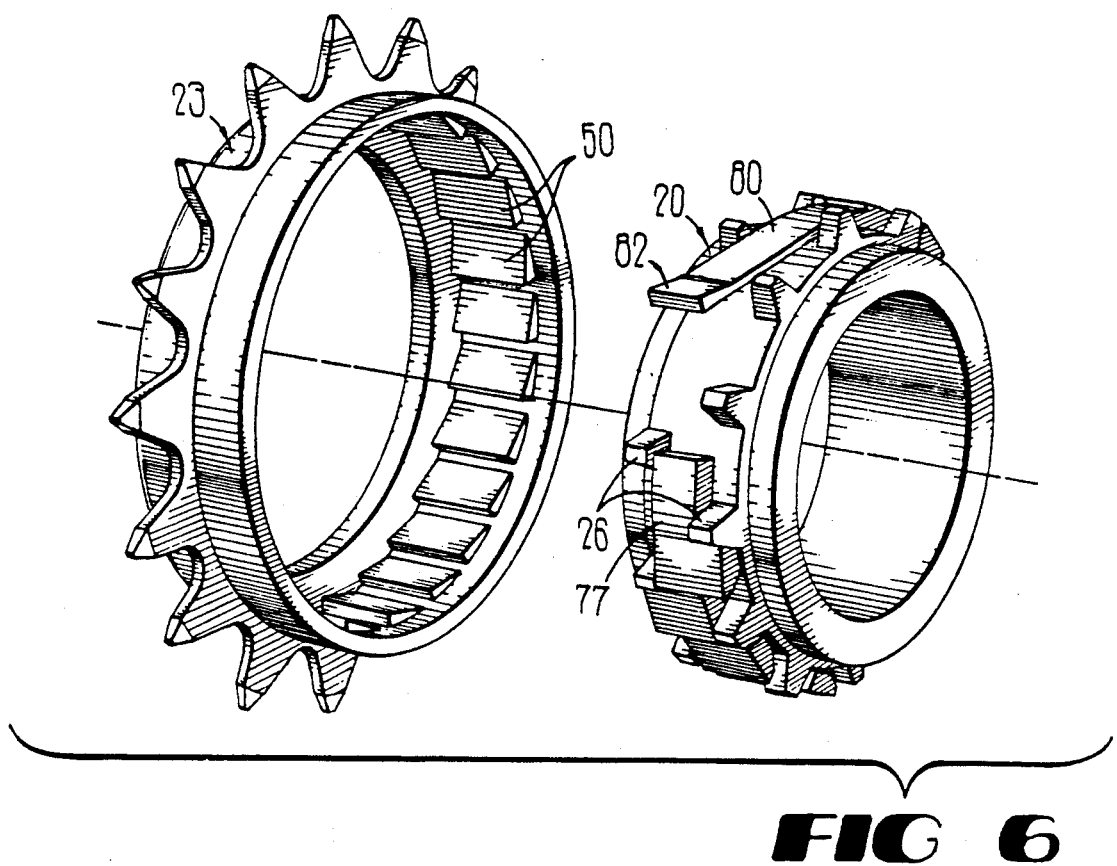
FIG. 6 is is a perspective view of an alternate disclosed embodiment of an inner drive wheel, pawl ring, and the outer wheel, according to the present invention.
Figure 7:
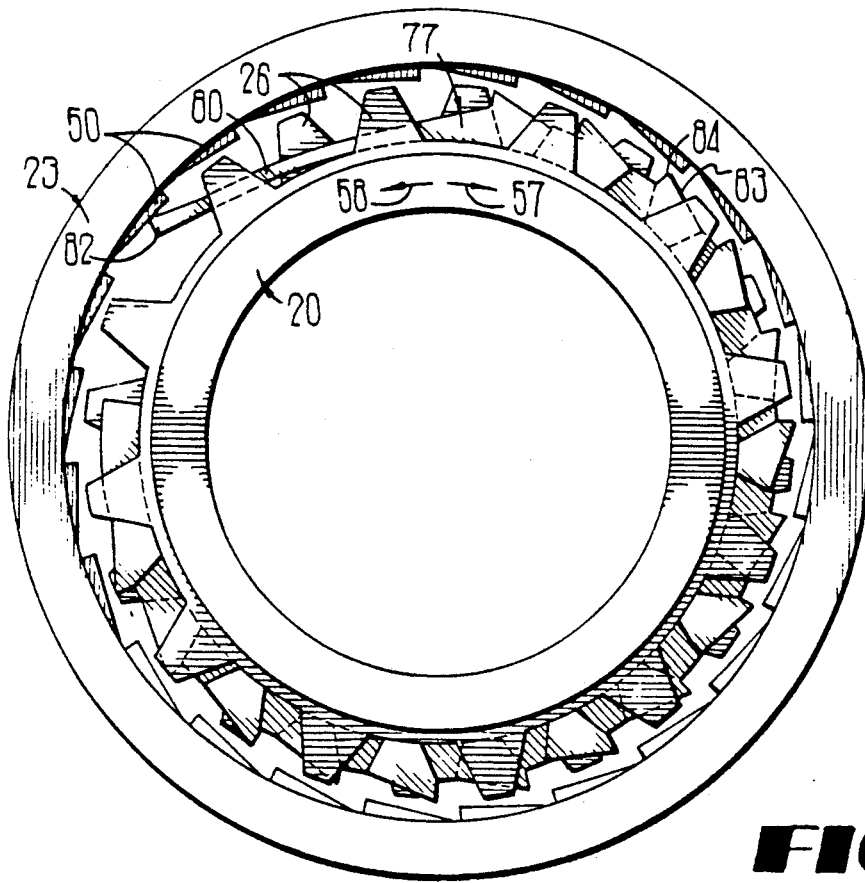
FIG. 7 is an axial view of the assembled inner drive wheel, the pawl ring, and the outer wheel, illustrated in FIG. 6.

FIG. 6 is a perspective view of yet another alternate disclosed embodiment of the inner drive wheel 20 and the outer wheel 23. In this embodiment, a removable C-shaped ring 77 includes an extended member 80 which terminates in a radially projecting drive pawl 82. As better illustrated in FIG. 7, the member 80 extends substantially tangential to the outer surface 29 of the inner wheel 23. The high edge 83 of the drive pawl 82 rides against the sliding surface of the ratchet teeth 50 of the outer wheel 23. An engagement surface 84 is defined by the wedge-shaped drive pawl 82.

Figure 8:
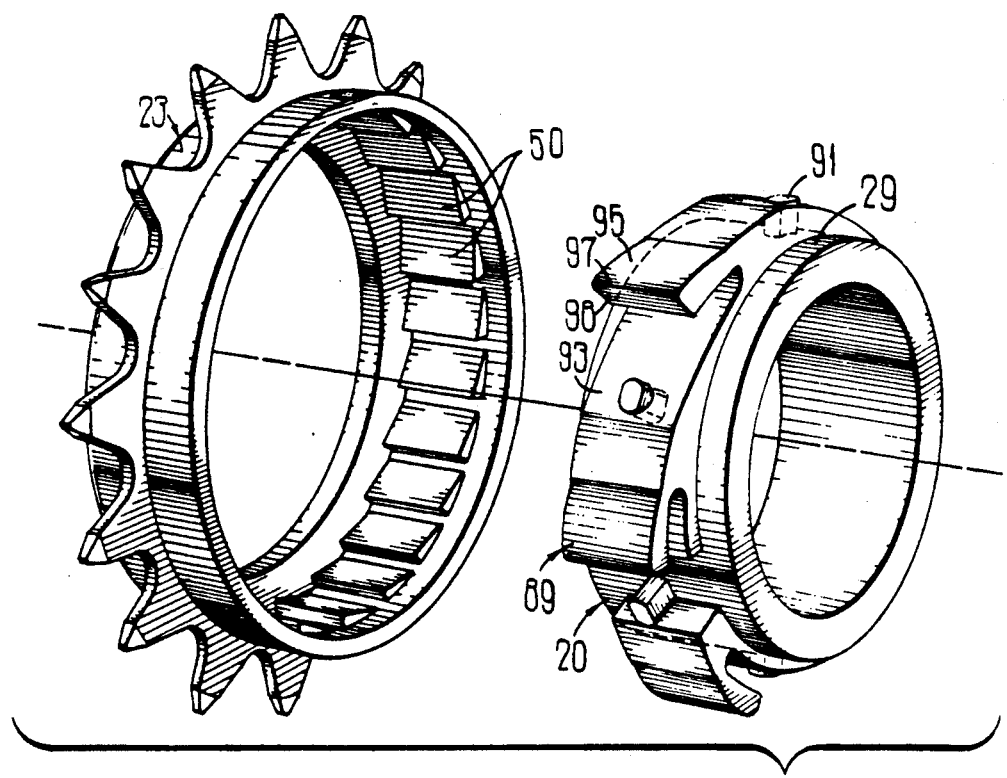
FIG. 8 is an alternate disclosed embodiment of the present invention having a pawl ring flexibly mounted on studs extending radially from the inner drive wheel.

FIG. 8 is an alternate disclosed embodiment of the present invention having a pawl ring 89. The inner wheel 20 includes a series of radially extending studs 91. A plurality of apertures 93 in the pawl ring 89 correspond to the studs 91. The apertures 93 permit the ring 89 to be received around the outer surface 29 of the ring 20. The apertures 93 in a preferred embodiment are slightly larger than the studs 91. This loose over-size fit permits the pawl ring 91 to have relative circumferential movement with respect to the surface 29. A plurality of pawls 95 integral to the ring 91 extend as a cantilever curvedly from the ring 89 towards the ratchets 50 of the outer wheel 23. The pawls 95 terminate in a head 96 which defines a sliding edge 97 and a radial engaging surface 98.

Figure 9:
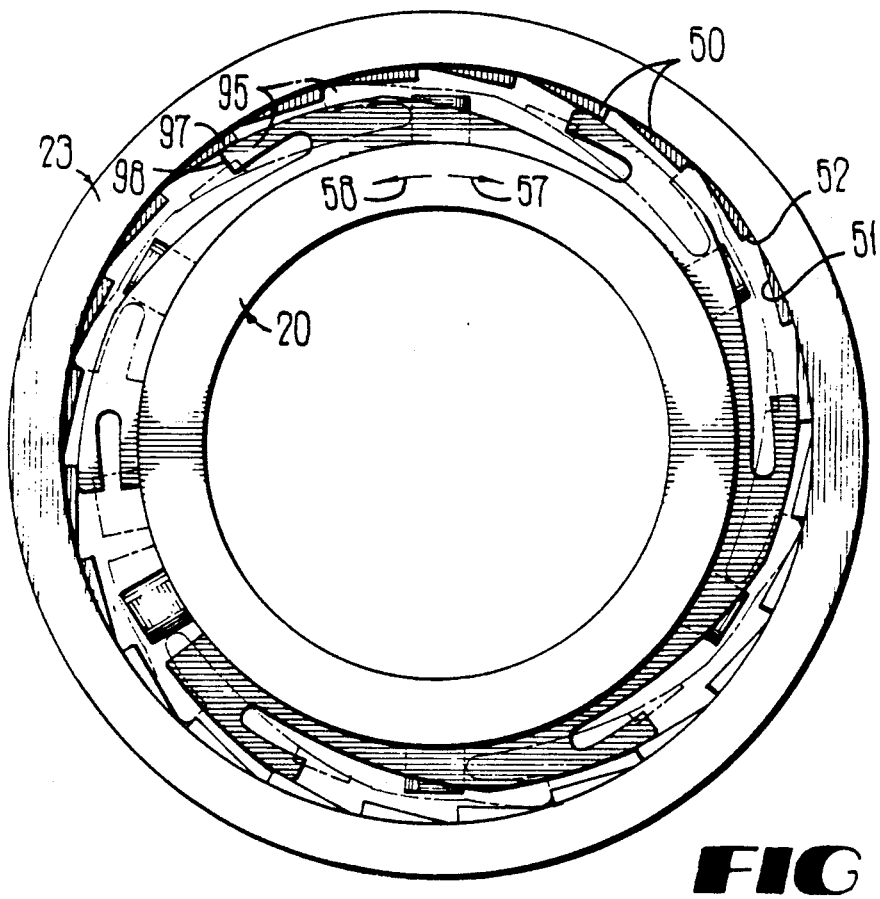
FIG. 9 is an axial view of the inner drive wheel, the pawl ring, and the outer wheel, illustrated in FIG. 8, with the pawl ring shown in phantom engaging the ratchets of the outer wheel.

FIG. 9 provides an axial view of the pawl ring 89 and the gear wheels 20 and 23 as illustrated in FIG. 8. The pawls 95 extend outwardly towards the ratchet teeth 50. The sliding edge 97 contacts the sliding surface 51. Illustrated in phantom is the engagement surface 98 of the pawl teeth 95 contacting the engagement surface 52 of the ratchet teeth 50.

Figure 10:
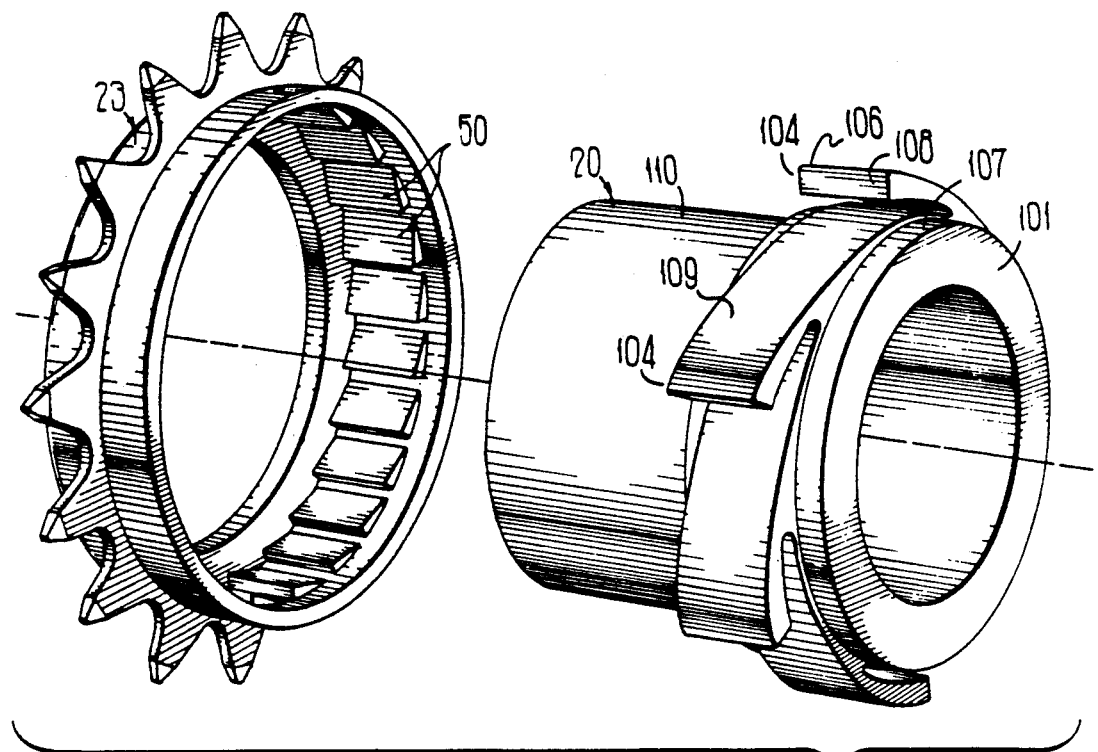
FIG. 10 is a perspective exploded view of an alternate disclosed embodiment of an inner drive wheel having curvedly extending integral pawls, coaxial with the outer wheel, according to the present invention.
Figure 11:
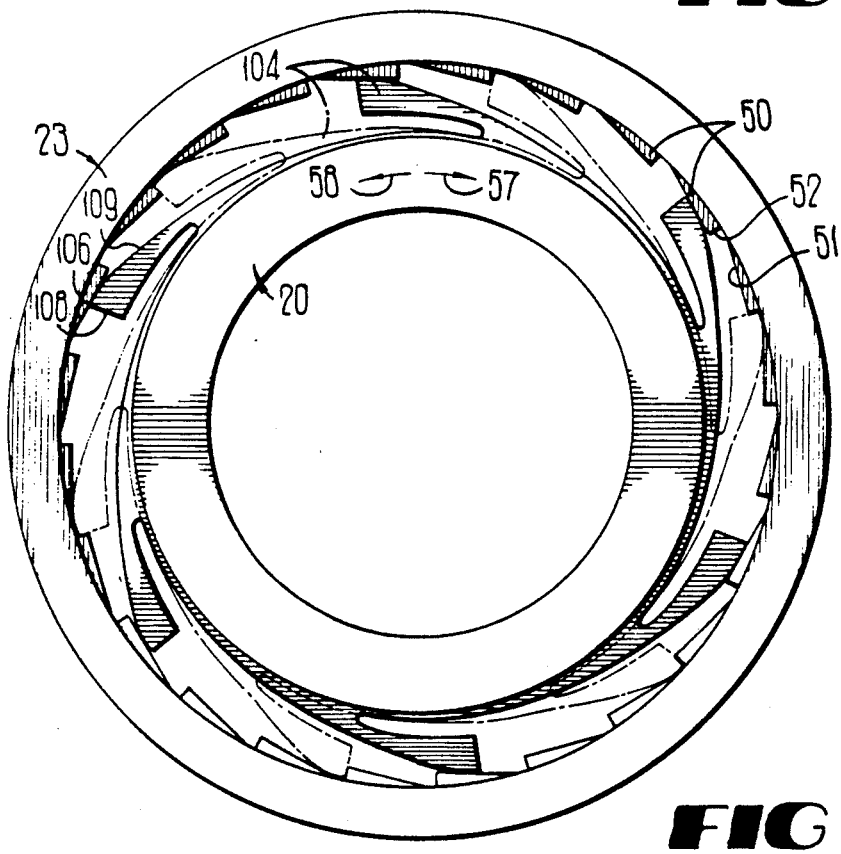
FIG. 11 is an axial view of the inner drive wheel with integral curved pawls, and the outer wheel, illustrated in FIG. 10.

In an alternate embodiment, the pawls are integral with the inner drive wheel. FIG. 10 illustrates a cylindrical drive shaft 101 similar to the inner wheel 20, which includes a plurality of integral pawls 104 extending from a raised bearing surface 107. As may be appreciated by one of skill in the art, the shaft 101 may be part of a pedal-drive for a bicycle or connected to another rotation device. Each pawl terminates in a head 106 which defines a sliding edge 108 and a radial engaging surface 109. A connector shaft 110 extends from one side of the shaft 101. The pawls 104 curve outwardly to ride against the ratchet teeth 50 of the outer wheel 23 as illustrated in FIG. 11. Illustrated in phantom are the engaging surfaces 109 of the pawls 104 engaging the ratchet teeth 50.

The disclosed ratchet assembly according to the present invention operates by positioning the inner wheel and pawl ring (or integral pawls) coaxial with the outer wheel. The pawls are positioned within the cavity of the outer wheel housing and adjacent the ratchet teeth. Rotating the inner wheel in a first direction with respect to the outer wheel permits the pawls to slide across the wedge sliding surface of the ratchet teeth. The inner wheel and the outer wheel thus free-wheel or rotate in opposite directions with respect to each other. To engage the pawl and ratchets and thereby drive the outer wheel, the direction of rotation on the inner wheel is reversed. The pawls engage the ratchet teeth and drive the outer wheel.

With attention directed to FIG. 1, the C-shaped pawl ring 32 is flexed radially sufficient to snap the pawl ring 32 over the teeth 26 and lodge the pawl ring 32 between the off-set series of teeth 26a and 26b. The pawl ring 32 has the first arcuate section 33 having a radius approximately equal that of the outer surface 29 so that the pawl ring 32 snugly wraps around the inner wheel 20. The shorter arcuate section 34 at one end of the pawl ring 32 arcs away from the surface 29 and has a larger radius than the first section 33 of the ring 32.

As shown in FIG. 2, the inner wheel 20 with the pawl ring 32 installs coaxial in the cavity 56 of the outer wheel 23. The sliding edge 36 contacts the sliding surface 51. The angularly protruding drive pawl 63 thus rides over the ratchet teeth 50 on the inner surface 47 when the inner wheel 20 rotates in a first direction indicated by the arrow 57. When the inner wheel 20 is driven in a reverse direction as indicated by the arrow 58, the engagement surface 37 of the drive pawl 63 catches on the engagement surface 52 of a ratchet tooth 50 as illustrated in FIG. 3. The force of engagement pushes the pawl ring 32 radially outward from the surface 29 to bring the pawls 35 into engagement with the ratchet teeth 50. The pawls 35 wedge against the ratchet teeth 50 and the radial teeth 26. The outer wheel 23 is driven by the inner wheel 20 as both rotate in the same direction.

Figure 5:
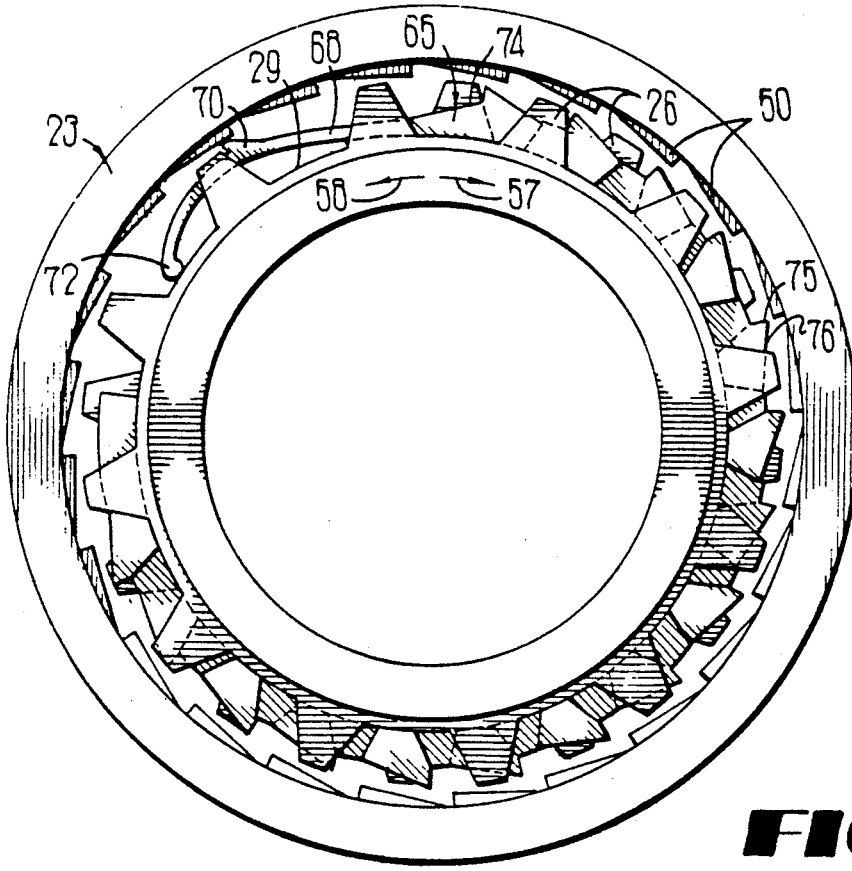
FIG. 5 is an axial view of the assembled inner drive wheel, the pawl ring, and the outer wheel, illustrated in FIG. 4.

The embodiments illustrated in FIGS. 4 and 6 operate similarly to the embodiment of FIG. 1. As illustrated in FIGS. 4 and 5, the pawl ring 65 of a preferred embodiment is installed on the inner wheel 20 as described above by lodging the pawl ring 65 between the off-set series of teeth 26a and 26b. The inner wheel 20 with the pawl ring 65 is installed coaxial in the outer wheel 23. The edge 75 contacts the sliding surface 52. The protruding drive pawl 70 rides over the ratchet teeth 50 when the inner wheel 20 rotates in a first direction indicated by the arrow 57. The arcuate section 68 moves radially and the free end 72 moves circumferentially along the surface 29 as the drive pawl 70 rides on the sliding surface 51. The arcuate section 68 acts as a spring to bias the drive pawl 70 outwardly against the ratchet teeth 50. Turning the inner wheel 20 in a reverse direction 58 causes the surface 76 of the drive pawl 70 to engage a ratchet tooth 50 as illustrated in phantom in FIG. 5. The force of engagement pushes the pawl ring 65 radially outward from the surface 29 to bring the pawls 35 into engagement with the ratchet teeth 50. The engagement surfaces 37 catch the engagement surfaces 52 to wedge the pawl ring 65 between the ratchet teeth 50 and the radial teeth 26.

The embodiment of the present invention illustrated in FIG. 6 uses a drive pawl 82 at the end of a tangential extension 80 of the pawl ring 77. The pawl ring 77 is installed as described above for the pawl rings 32 and 65. The inner wheel 20 is coaxially installed in the outer wheel 23. The edge 83 contacts the sliding surface 51 of the ratchet teeth 50. The drive pawl 82 thus rides over the ratchet teeth 50 when the inner wheel 20 rotates in a first direction 57. Driving the inner wheel 20 in a reverse direction 58 causes the radial surface 84 of the drive pawl 82 to engage the radial surface 52 of a ratchet tooth 50. The force of engagement pushes the pawl ring 77 radially outward from the surface 29 to bring the pawls 35 into engagement with the ratchet teeth 50. The pawl ring 77 wedged between the inner wheel 20 and the outer wheel 23 communicates the rotational force to the outer driven wheel 23.

The embodiment illustrated in FIG. 8 uses over-sized apertures 93 which correspond to radial studs 91 extending from the surface of the wheel 20. The pawl ring 89 is flexed radially sufficient to snap the pawl ring 89 over the studs 91. As illustrated in FIG. 9, the cantilever pawls 95 ride over the wedge-shaped ratchets 50 when the inner wheel 20 is turned in a first direction 57. The pawls 95 are biased outward against the ratchets 50 and the end of each pawl 95 flexes radially as the pawl 95 travels over the ratchet teeth 50. Reversing the direction of the inner wheel 20 causes the pawls 95 to each engage a ratchet tooth 50 as illustrated in phantom in FIG. 9. The force of engagement pushes the pawl ring 89 radially outward slightly within the constraints of the apertures 93 and the studs 91. This makes a tight wedged connection between the inner wheel 20 and the outer wheel 23 to communicate the drive force from the inner wheel 20 to the outer wheel 23.

In a preferred embodiment illustrated in FIG. 10, the pawls 104 are integral with the wheel or shaft 101. As illustrated in FIG. 11, the heads 106 ride against the sliding surfaces 51 of the ratchet teeth 50 when the shaft 101 is turned in a first direction 57. Reversing that direction as indicated by the arrow 58 causes the engaging surfaces 109 of the pawls 104 to catch the engagement surfaces 52 of the ratchet teeth 50 and transmit the rotational force from the inner wheel 20 to the outer wheel 23.

In a preferred embodiment, the inner wheel 20 and the outer wheel 23 are made from polycarbon plastic. Such materials are available from General Electric. It is preferred that the pawl ring 32, 65 and 77 be made from a plastic which has high compression strength and is flexible in tension. Such materials include DuPont Dylren plastic and Celanese Celcon plastics. These and similar plastics are naturally lubricating so that the free-wheel ratchet assembly of the present invention may be used in harsh environments without the necessity to replace lubricants. The ratchet assembly remains free from problems such as component fatigue and lubricant lock-up such as may be caused by dirt or other contaminates in the ratchet assembly. The free-wheel ratchet assembly of the present invention is particularly suited for trail bikes which are used off of paved roads in fields and in wet areas such as brooks and streams. Further, the use of such materials permit the present invention to be manufactured in quantity at low cost by injection molding.

The principles, preferred embodiments and modes of operation of the present invention have been described in the foregoing specification. The invention is not to be construed as limited to the particular forms disclosed, because these are regarded as illustrative rather than restrictive. Moreover, variations and changes may be made by those skilled in the art without departing from the spirit of the invention as described by the following claims.

What is claimed is:

1. A ratchet assembly comprising:
   an outer wheel having ratchet teeth on an inner surface;
   an inner wheel coaxial with the outer wheel;
   two rows of radially extending teeth on the outer circumference of the inner wheel; and
   a ring disposed between the two rows and having a plurality of spaced-apart, wedge-shaped pawls extending axially from the ring, each pawl between adjacent teeth in a rows of teeth.

2. The apparatus of claim 1, wherein the rows of the teeth are staggered.

3. The apparatus of claim 1, wherein the wedge-shaped pawls axially extend from alternate sides of the ring.

4. A ratchet assembly comprising:
   an outer wheel having ratchet teeth on an inner surface;
   an inner wheel coaxial with the outer wheel, said inner wheel having a plurality of radially extending studs on the outer surface of said inner wheel;
   a C-shaped ring defining a plurality of radial apertures on the ring to receive the studs and having at least one angularly extending pawl,
   whereby the pawl rides freely over the inner surface when the inner wheel rotates in a first direction and the pawl engages with the ratchet teeth when the inner wheel rotates in a second reverse direction.

5. A ratchet assembly comprising:
   an outer wheel having ratchet teeth on an inner surface;
   an inner wheel coaxial with the outer wheel; and
   a C-shaped ring having a first arcuate section of a first radius and a second smaller arcuate section having a second radius greater than the first radius and integrally joined to and extending from one end of the first arcuate section, the first arcuate section having at least one angularly extending first pawl and the second arcuate section having at least one angularly protruding second pawl to ride over the ratchet teeth protruding from the inner surface when the drive wheel rotates in a first direction and to engage the ratchet teeth when driven in a reverse direction such that the force of engagement pushes the first arcuate section radially outward bringing the first pawl into engagement with the ratchet teeth.

6. A ratchet assembly comprising:

an outer wheel having ratchet teeth on an inner surface;

an inner wheel coaxial with the outer wheel; and a C-shaped ring having a first arcuate section and a second linear section integrally joined to and extending from one end of the first arcuate section, the first arcuate section having at least one angularly extending first pawl and the second linear section having at least one angularly protruding second pawl to ride over the ratchet teeth protruding from the inner surface when the drive wheel rotates in a first direction and to engage the ratchet teeth when driven in a reverse direction such that the force of engagement pushes the first arcuate section radially outward bringing the first pawl into engagement with the ratchet teeth.

* * * * *